United States Patent [19]

Malivoir et al.

[11] Patent Number: 4,491,214
[45] Date of Patent: Jan. 1, 1985

[54] METHOD AND APPARATUS FOR HANDLING CAST IRON PIPES WITH A VIEW TO THEIR BEING TURNED HEAD TO TAIL

[75] Inventors: Roger Malivoir, Pont A Mousson; Gilbert Mayer, Nancy, both of France

[73] Assignee: Pont-a-Mousson S.A., Nancy, France

[21] Appl. No.: 484,670

[22] Filed: Apr. 13, 1983

[30] Foreign Application Priority Data

Apr. 16, 1982 [FR] France ................. 82 06718

[51] Int. Cl.³ .................................... B65G 47/24
[52] U.S. Cl. ................................ 198/374; 198/414; 414/31; 414/745
[58] Field of Search ............ 198/413, 414, 374, 394, 198/399, 379, 401; 414/31, 745, 910, 55, 56

[56] References Cited

U.S. PATENT DOCUMENTS 3,071,868  1/1963  Kalman .................... 198/379 X
4,236,624  1/1980  Buzzi ........................ 198/399
4,310,281  1/1982  Egashira ................. 414/745 X

FOREIGN PATENT DOCUMENTS 284688  10/1970  U.S.S.R. .................... 198/379

Primary Examiner—Joseph E. Valenza
Assistant Examiner—Jonathan D. Holmes
Attorney, Agent, or Firm—Sughrue, Mion, Zinn, Macpeak and Seas

[57] ABSTRACT

Head-to-tail turning of one pipe out of two in a series of pipes being presented at irregular intervals which may occur at even or odd multiples of a step. A horizontal transporter moves by intervals of two steps and a turning device for one pipe out of two moves by one step as necessary to place itself in a position for turning beneath the pipe to be turned. Pipes are arranged head-to-tail, horizontally and vertically, one joint alternating with one smooth end at each end of the pipes in the production of pipe bundles.

10 Claims, 18 Drawing Figures

METHOD AND APPARATUS FOR HANDLING CAST IRON PIPES WITH A VIEW TO THEIR BEING TURNED HEAD TO TAIL

BACKGROUND OF THE INVENTION

The present invention relates to the handling of cast iron pipes exiting from centrifuging machines and a coating station. More specifically, the invention relates to the handling of the pipes on a horizontal or approximately horizontal transporter between the manufacturing exit of such pipes and a transporter for producing beds of pipes arranged head to tail, in an even or odd number, a female bell joint of one pipe alternating with a smooth male end of the next pipe. The successive beds are intended to be superposed to produce bound bundles.

Since the bundles of pipes to be produced must have sizes and weights compatible with handling devices and vehicles, the invention relates particularly to pipes with small diameters of 60 to 300 mm or, if need be, medium diameters not exceeding 600 mm.

Whether the beds comprise an even number or an odd number of pipes, one joint alternates with a smooth end in the bundles produced, both horizontally on the same bed and vertically between two superposed adjacent beds. The result is that the preparation of the beds to be superposed consists of bringing the pipes onto a horizontal transporter, with all the joints being oriented in the same direction, and turning one pipe out of two by 180° by means of a hoisting and turning device known as a turner, at a fixed turning station. Downstream from the turning station, the pipes are removed to produce successive beds and then are stacked on a packing and removal carriage and banded.

For the purpose of counting, with a view to producing beds to be stacked, the pipes are received individually on V-shaped supports spaced at regular intervals known as steps on the horizontal transporter. Endless chains of the transporter advance intermittently with regularly spaced stop times to enable the pipe depositing, turning and removal operations.

The known technique therefore enables one pipe out of two to be turned by 180° during a stop by the transporter at a fixed turning station, provided that all the consecutive V-shaped supports carry a pipe, or if this requirement is not met, provided that the transporter advances step by step over any empty supports.

For reasons of quality control and productivity, however, neither of these two requirements are met. The pipes are manufactured in pairs in twin centrifuging machines and are deposited in pairs on two pairs of consecutive V-shaped supports of the transporter which, for this reason, advances two steps at a time. Moreover, upstream of the turner, quality control of the pipes is carried out and the unsatisfactory pipes are withdrawn from time to time, either to be touched up or rejected. The result is that, with an advance of two steps and with a transporter which is not completely stacked with pipes, there is an increased probability that the turner finds either an empty pair of V-shaped supports or a pipe which is not to be turned (the pipe to be being either one step upstream or downstream of the turning station). In other words, there is a high probability that the turner finds it impossible to rotate one pipe out of two since the advance is two steps at a time.

The problem at the turning station is thus to take one pipe out of two in spite of a two step advance and empty supports, i.e. in spite of the pipe to be turned not always being presented at a distance or multiple of two steps from the turning station but, on the contrary, often at a distance of one or an odd number of steps from the station.

SUMMARY OF THE INVENTION

An object of the invention is to provide a method for turning pipes which solves this problem and which is characterized by the movement of the turner in translation parallel to the transporter a distance of one step in one direction or the other, as need be, whereas the chains of the transporter move by two steps between two consecutive stops.

A further object of the invention is to provide a pipe turning device mounted on a carriage which slides in translation parallel to the endless chains of the pipe transporter on a run which is alternated by one step. With this arrangement the pipe turning station is movable by one step in either direction such that if necessary, that is if the pipe to be turned stops at a distance of one step from the turner, the turner moves by one step to catch the pipe and turn it. The invention therefore has the advantage of maintaining the rapid rhythm of progression of the transporter with runs two steps at a time, without being compelled to modify these runs in order to bring them back to one step in the case of an irregularity in the positioning of the pipe to be turned, which would be an obvious but complicated solution and which would cause a slow down.

Preferably, the one step movement of the turner, under the layer of transported pipes, takes place during the advance of the transporter chains.

It is also desirable to rapidly turn the pipe during a stop by the horizontal transporter, with a transmission mechanism which is as simple and takes up as little space as possible between a driving shaft driven by a motoreductor group, for an arc of rotation of 180°, and a driven shaft connected with the turner itself.

This is implemented in accordance with the invention by a device wherein, between the driving and driven shafts, there is interposed a transmission mechanism with an articulated "three bar" planar system comprising two uneven cranks connected by a rod and cooperating with torque from straight gears of different diameters, the largest gear being rotatably connected with the largest crank while the smallest crank is rotatably connected to the driving shaft and the smallest gear is rotatably connected to the turner itself.

This transmission mechanism has the advantages of very rapidly turning a pipe simply laid on a cradle support through 180°, and in particular:

(1) the "three bars" system provides very gentle acceleration and deceleration, thus removing any shock likely to eject the pipe from its support, and
(2) the torque gears re-establish the speed necessary for turning (multiplication) which has been reduced by the "three bars" system.

DETAILED DESCRIPTION OF THE PREFERRED EMBODIMENT

Figure 1:
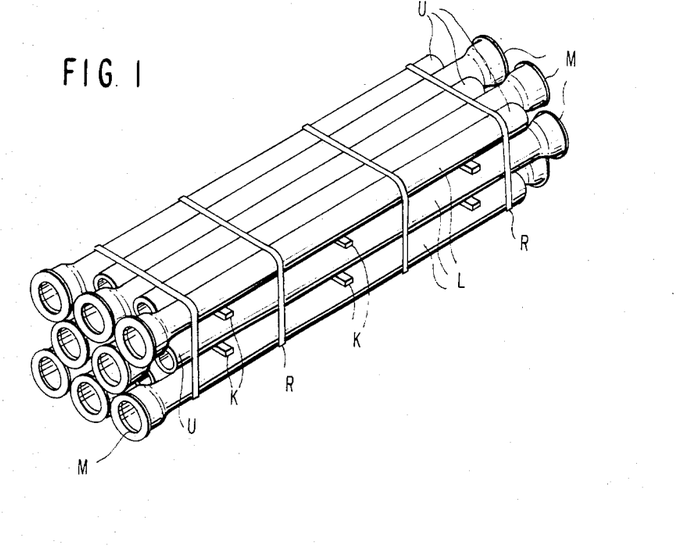
FIG. 1 is a perspective view of a bundle of pipes to be obtained, with head to tail arrangement of the bell joints and smooth ends.
Figure 1A:
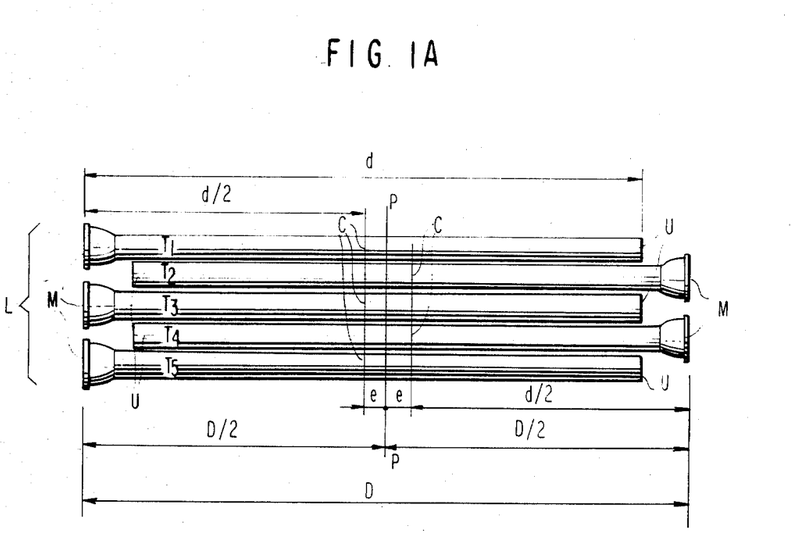
FIG. 1A is a schematic planar view, on a small scale, of a bed of head-to-tail pipes offset one in relation to the other.
Figure 2:
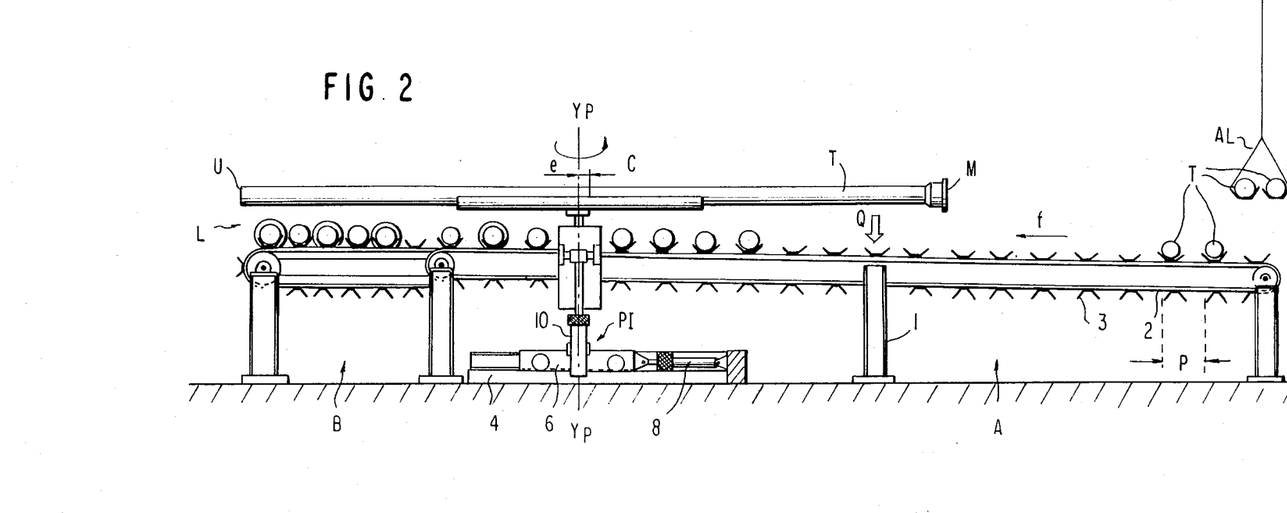
FIG. 2 is a schematic elevational view, on a small scale, of a pipe transporter fitted with a pipe turner.

General Description of the Apparatus (FIGS. 1, 1A and 2)

The apparatus of the invention is applied to the production of bundles of cast iron pipes T having bell joints M, bound by metal or plastic bands or ribbons R.

As is known, the pipes are arranged in superposed beds L constituting a stack or a bundle. Horizontally on each bed L and vertically between two superposed beds, they are arranged head to tail, one bell joint M of a pipe alternating with a smooth end U of an adjacent pipe so as to reduce the space taken up by each bundle. For this purpose (FIG. 1A), the five identical pipes T1 to T5 of a bed L are offset longitudinally in relation to each other by a length corresponding at a minimum to that of their joint M. The result is that if d is the total length of each pipe, and if C designates the middle of this length d, the total length D of a bed or bundle L is equal to the length d of a pipe increased by at least the length of a joint M, the middle C of each pipe being offset either to the right or to the left by a distance e (decentering) in relation to the median P—P (shown with a dotted line) of the total bundle length D. The median P—P is also the track of a symmetry plane P—P of a bed or bundle.

Since the bundles to be produced must retain dimensions and weights within the capabilities of the handling devices and vehicles, the invention relates more particularly to pipes T with small diameters, for example from 60 to 300 mm, or at most with average diameters going for example up to 600 mm, the pipes in a same bundle in all cases having the same diameter. Each bundle is composed of an odd or even number of beds L of a pipes T. Each bed contains an odd or even number of pipes T.

In the example of FIG. 1, there are three superposed beds of five pipes whose diameter is for example 80 mm or 100 mm. Between two superposed beds wooden wedges K are interposed to immobilize the beds within each bundle. Wedges K are arranged transversely in relation to the length of the pipe T which is, for example, on the order of 6 m.

In the following drawings, for purposes of simplification, the ends of the pipes with bell joints M are shown by two concentric circles whereas the smooth ends U are shown by a single circle of a smaller diameter than the exterior circle of the bell joint M.

There may be an even number of superposed beds, for example two or four beds, or an odd number, for example three, as shown in FIG. 1. In each bed, there may be an even number of pipes, for example two, four or six, or an odd number of pipes, for example three or five. Whether the beds are composed of an odd or even number of pipes or whether the number of beds is odd or even, there is always a head-to-tail arrangement on each bed horizontally as well as vertically between superposed beds:

Ends of odd beds:

M-U-M-U-M

U-M-U-M-U

M-U-M-U-M

Ends of even beds:

M-U-M-U

U-M-U-M

M-U-M-U

The apparatus in which the pipe turning device of the invention is located contains the following components which are summarily shown in FIG. 2:

A horizontal or approximately horizontal pipe transporter A following a forward direction marked by an arrow f which is perpendicular to the pipes T. The pipes T are arranged on the transporter A at regular intervals or steps p, parallel to each other, that is, to their stocks.

Calling the tail of arrow f as upstream and the point of arrow f as downstream, at the upstream end of transporter A, the pipes T are brought in pairs by any known means, for example, by a hoisting apparatus AL. Pipes T coming from a centrifuging ship using twin machines arrive upstream of transporter A with their ends having the same orientation, that is with their bell joints M on a same side and their smooth ends U on the other side. In this case the smooth ends U are seen.

Downstream from transporter A, as a continuation, there is a similar transporter B for producing beds L of pipes, the pipes being arranged head to tail at closer intervals or steps than on transporter A.

Close to the downstream end of transporter A, the turner PI of the invention is arranged. The turner or turning device PI of the invention consists essentially of a carriage or sliding gear with a backward and forward translation movement following a path equal to one interval step between pipes on transporter A, said carriage being provided with means for raising and turning a pipe.

It has been seen that transporter B transports the produced beds. Transporter A is for the head-to-tail presentation of pipes, the head-to-tail arrangement being obtained downstream from the turning device PI on transporter A. Upstream from transporter A the smooth ends U of the pipes all have the same orientation. They are likewise aligned at their bell joints. Passage from transporter A to transporter B takes place by known handling means which are not shown. For example, a hoisting apparatus may remove the pipes one by one from transporter A to place them on transporter B in the same order.

In brief, as the series of pipes T is presented upstream of the turning device PI of the invention, one pipe out of two has to be turned by 180° in order to obtain the head-to-tail orientation. This orientation is obtained downstream from the turning device PI by raising one pipe above transporter A, turning it by 180° above transporter A, and replacing it on transporter A. The turning operation takes place during a stop between two runs of transporter A which advances by two steps at regular periods or runs separated by regular stops. It will be seen below that, because of the absence of pipes on transporter A at certain places, the sliding gear solves the problem of presenting the turning device PI at a point where there is a pipe to be turned.

Detailed Description (FIGS. 2, 3, 5, 8)

Transporter A (FIGS. 2–8) comprises a frame 1 carrying endless chains 2 themselves carrying V-shaped components or cradles 3 for supporting pipes T which are regularly spaced at intervals of one step p. The endless chains 2 are driven in an intermittent forward movement following the direction of arrow f, by a motoreductor group which is not shown. The intermittent forward movements, separated regularly by stops, have a run length equal to two steps (=2p) to advance two pipes at a time.

Pipes T are laid in pairs on the V-shaped components 3 transversely to chains 2 and therefore transverse to the forward direction f.

The turning device (FIGS. 3, 5, 8) of the invention or, in short, turner PI is mounted on a frame 4 with a rolling track 5 composed of a pair of profiled guides parallel to chains 2 and to direction f.

In accordance with the invention, a carriage or sliding gear 6 is mounted on frame 4, said carriage consisting of a rectangular metal frame with friction rollers 7. The sliding gear 6 is capable of an alternative run equal to a spacing of one step p of the V-shaped components 3 on chains 2, under the action of a pressurized fluid jack 8 on frame 4 and attached to the frame of the sliding gear 6.

Sliding gear 6 carries the mechanism of the turner PI, that is:

means for raising a pipe above transporter A and the transported pipes (FIG. 2); and
means for turning a pipe by 180° in a horizontal plane.

Figure 3:
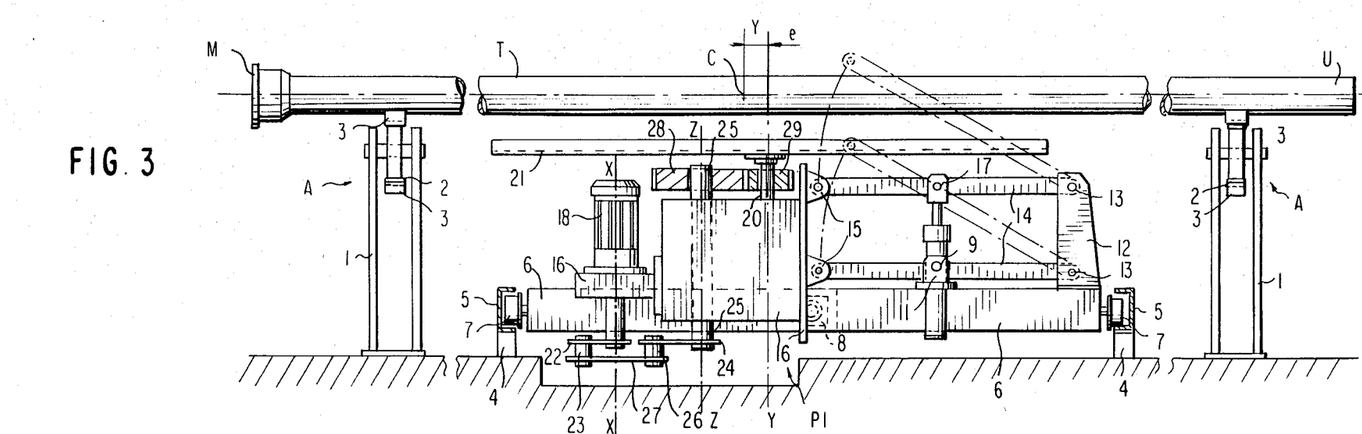
FIG. 3 is a schematic elevational view of a pipe turner, in the low position in relation to the transporter, on a larger scale than FIG. 2.
Figure 4:
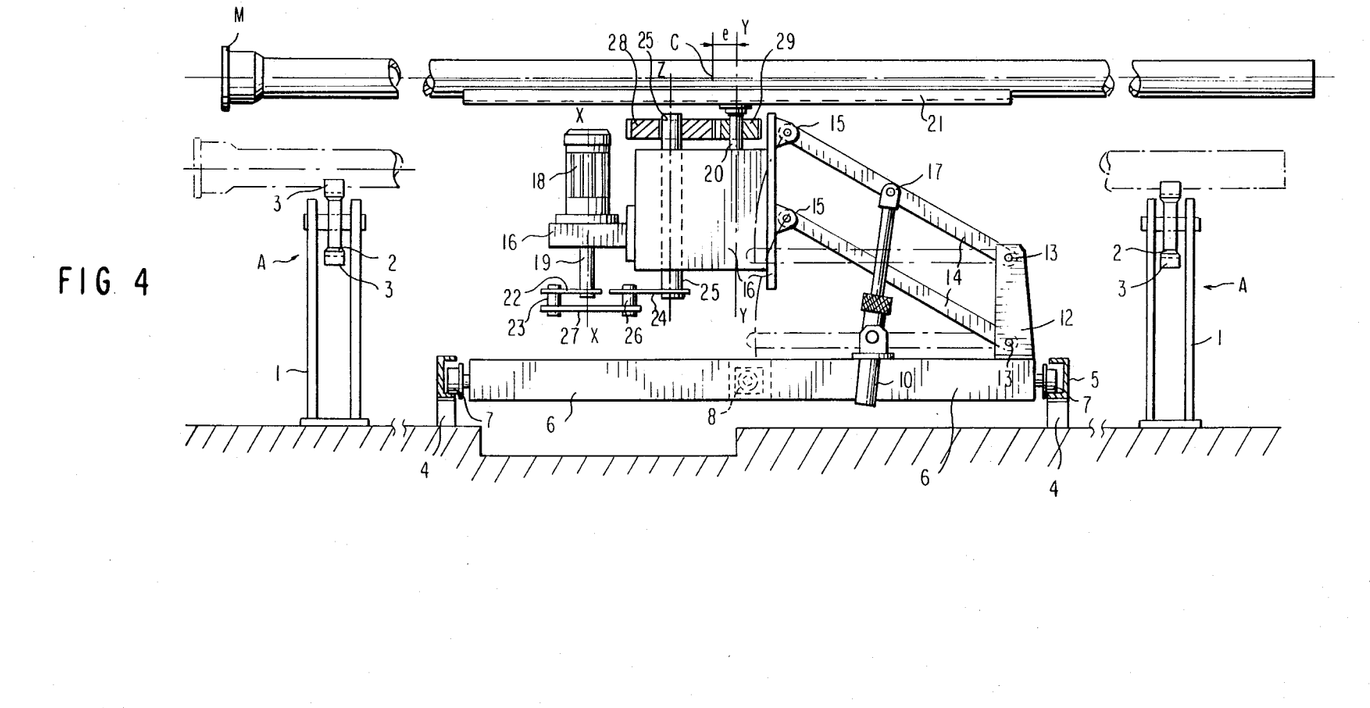
FIG. 4 is a like view to FIG. 3 of the turner in the high position in relation to the transporter before turning.
Figure 4A:
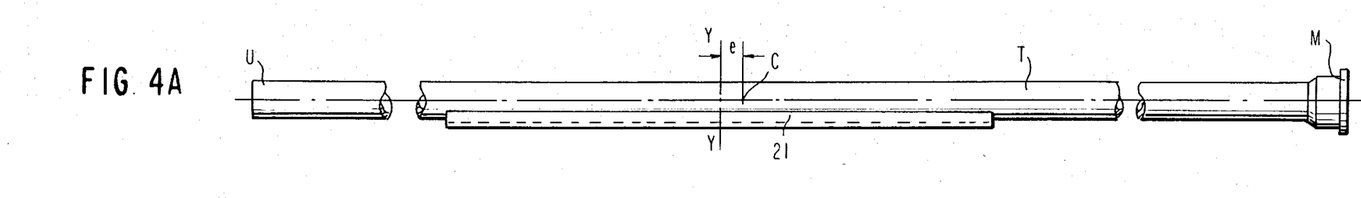
FIG. 4A is a partial view of a pipe turned by 180° in relation to the position in FIG. 4.
Figure 5:
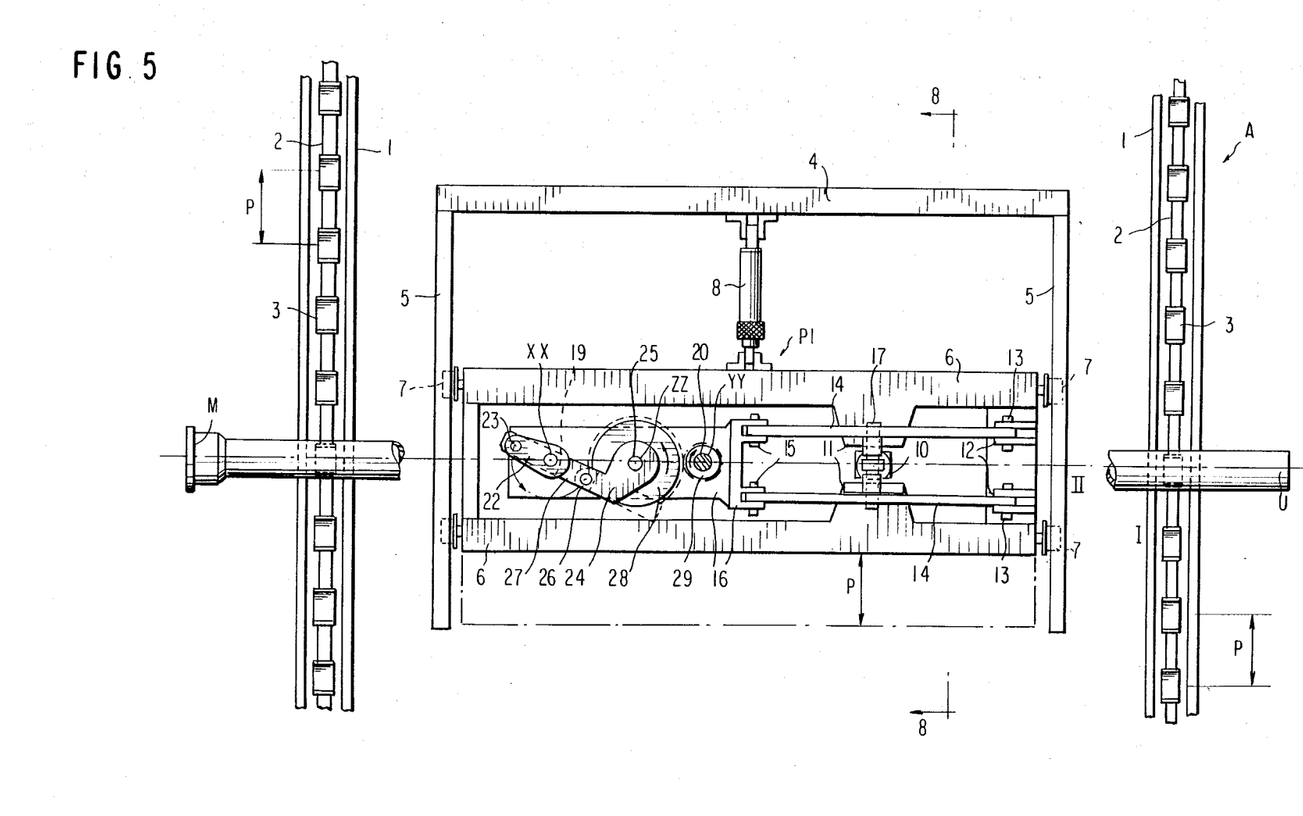
FIG. 5 is a schematic view from above of the turner before rotation.
Figure 6:
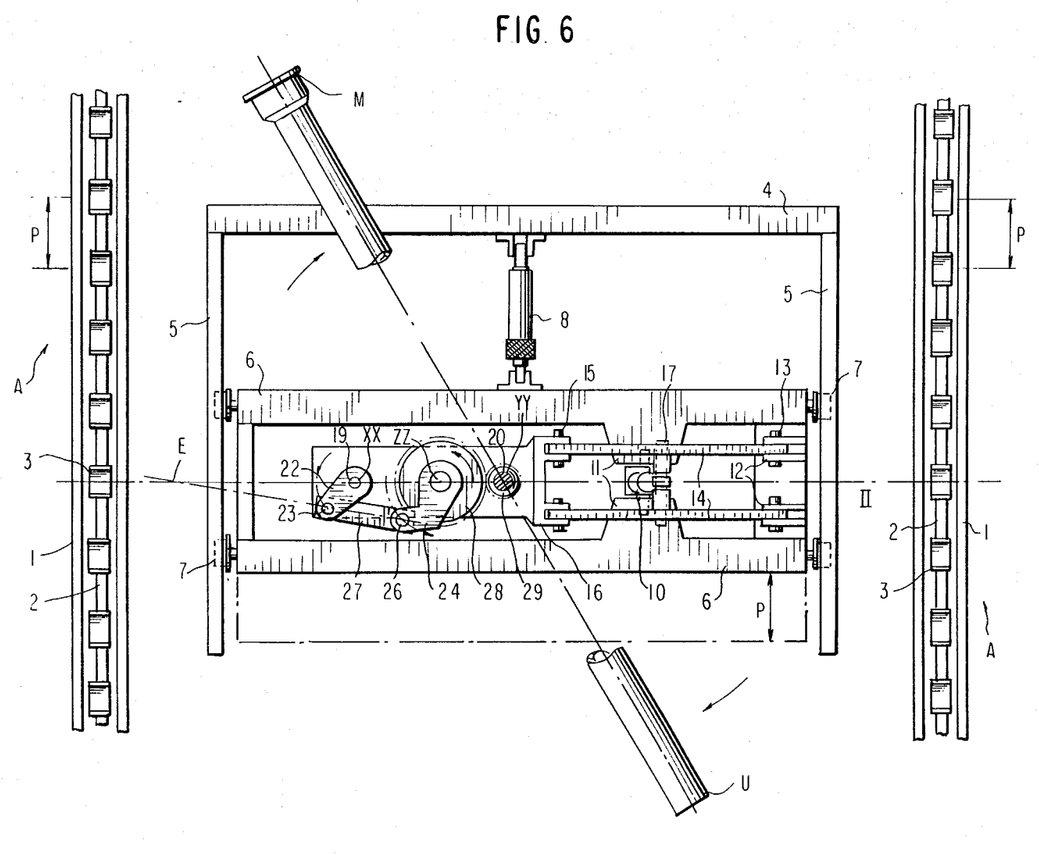
FIG. 6 is a view corresponding to FIG. 5 of the turner during rotation, that is during the turning of a pipe.

Hoisting Means (FIGS. 3–5)

A hoisting pressurized fluid jack 10, with a vertical or approximately vertical axis, is articulated around a pin 9 with a horizontal axis on the frame of the sliding gear 6. Pin 9 is carried by a pair of lugs 11 fixed to sliding gear 6. The orientation of the axis of pin 9 is unimportant.

Sliding gear 6 carries a pair of uprights 12 on which are articulated two pins 13 spaced apart vertically with axes parallel to direction f. The pins 13 are coupled to the ends of two pairs of hoisting arms 14 which are parallel to each other, and which by means of pins 15 support on their ends a frame 16 containing the turning mechanism. The hoisting arms 14, the pins 13 and the pins 15 on frame 16 constitute an articulated parallelogram.

The end of the piston stem of the hoisting jack 10 is attached by a pin 17 towards the middle of the upper hoisting arms 14. The low and high positions of a pipe T obtained by the hoisting means will be described below.

Turning Means of the Invention (FIGS. 3–5)

Frame 16 carries a mechanism for turning a pipe T 180° in a horizontal plane. Frame 16 also carries a motoreductor group 18 for rotatably driving a driving shaft 19 with a vertical axis XX, a driven shaft 20 with a vertical axis YY carrying a horizontal groove with a V-shaped cross-section, of a length less than that of pipe T, intended to receive a pipe T which is to be turned around axis YY. Between shafts 19 and 20, frame 16 also carries a movement transmission intended to transform the rotatable continuous motor movement of shaft 19 into a driven movement of alternate 180° rotation of the driven shaft 20. Pipe T is simply laid on cradle 21 (with its middle C being offset e in relation to axis YY) without being fixed on cradle 21.

The movement transmission contains a system for transformation of movements and a system for increasing the speed of the run at a given time.

The transformation of movements is obtained by a steering gear known in kinematics as an "articulated system with three bars" comprising a first crank 22 wedged on the driving shaft 19 with which it is rotatably connected and carrying at its end a pivot 23, a second crank 24 which is longer than the first and which is elbowed, wedged on an intermediate shaft 25 with an axis ZZ which is parallel to axes XX and YY and rotatably connected to said intermediate shaft, and carrying on its end a pivot 26, and, articulated between pivots 23 and 26, a rod 27 connecting cranks 22 and 24.

By means of this system with three articulated bars 22, 24, 27, in order to obtain a rotation of the first crank 22 by an arc of 180°, during a continuous rotation, the second crank 24 turns by an arc of 90° taking into account the ratio of the geometric lengths of the cranks, that is, the interaxes 19–23 and 25–26 (the arcs are shown by dotted lines on FIG. 5). An increase in speed of the turning operation, and therefore of the run, between the intermediate shaft 25 and the driven shaft 20 is obtained by straight torque of gears. Gears 28 and 29, always in gear, are wedged respectively on shafts 25 and 20. They contain a large toothed wheel 28 and a small toothed wheel 29, for example, in a ratio of diameters ½, so as to obtain for the small wheel 29, and therefore for the V-shaped support 21 for turning a pipe, a speed twice that of the large wheel 28. That is, in the same time there is obtained a run which is twice that of the second crank 24, and therefore a run following an arc of 180° for a run of crank 24 following an arc of 90°. The directions of rotation of cranks 22 and 24 and of toothed wheels 28 and 29 are indicated by arrows in FIG. 5.

Frame 16 carries shafts 19, 20 and 25 as well as the three bar system 22, 24, 27 and toothed wheels 28 and 29. Axis YY of the driven shaft 20 is the axis for turning a pipe T. Axis YY passes through the middle of the length of cradle 21 which itself is located in the symmetry plane P—P of a bed or a bundle. To the contrary, by means of a device for alignment of the joints (known and not shown) upstream of the turner PI, the middle C of a pipe T placed on cradle 21 is not located in axis YY of the symmetry plane P—P (plane P—P containing axis YY) but rather it is offset by a decentering e in relation to axis YY.

Through the hoisting means, pipe support cradle 21 is capable of occupying a low waiting position beneath transporter A (FIG. 3) and a high turning position above both the transporter A (FIGS. 2, 4, and 9) and in particular above the layer of pipes T being transported so as not to hit said layer during the 180° turning.

Figure 7:
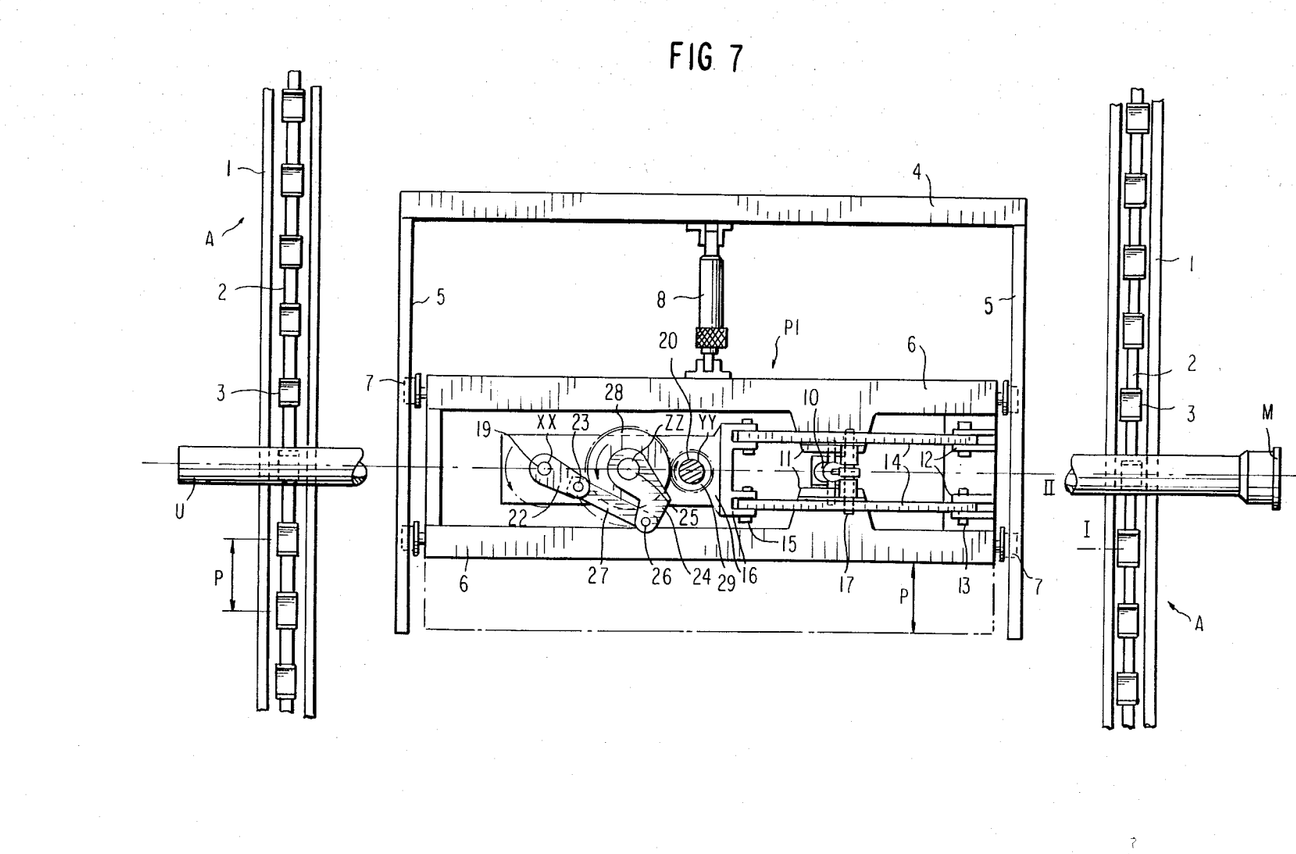
FIG. 7 is a planar view corresponding to FIGS. 5 and 6 of the turner after rotation of a pipe through 180°.

After turning a pipe by 180° in the horizontal plane, the bell joint M of the pipe, which was for example located at the left of the drawing (FIGS. 3, 4, 5), is located at the right of the drawing (FIG. 7).

Operation

The invention is intended to prepare on transporter A, in a head-to-tail position, pipes T to be transferred onto transporter B where a bed of pipes to be bundled is formed.

A pair of pipes T is brought onto a stopped transporter A (FIG. 2, on the right) by for example, a hoisting device AL. Two pipes T are deposited onto two consecutive V-shaped supports 3 with their bell joints and their smooth ends oriented on a same side. That is, for example, the smooth ends are oriented in the front for an observer looking at FIGS. 2, 8 and 9, or to the right in FIGS. 3 and 4. Moving forward periodically by two steps p, that is by two intervals between consecutive V-shaped supports 3, with intermediate stops between two successive forward moves, transporter A advances the pipes T to turner PI where one pipe out of two is turned by 180° during a stop of transporter A.

New pairs of manufactured pipes are thus deposited continually onto transporter A and fill the V-shaped supports which receive them.

However, on transporter A, between the upstream end bringing in pipes T (to the right on FIG. 2) and the turning station PI, there is a quality control station Q indicated by a vertical arrow pointing downwards on FIG. 2. At station Q, the pipes are examined and, if need be, are removed from transporter A to be touched up or rejected. The result is that downstream from station Q there are likely to be missing pipes and consequently empty V-shaped supports 3, distributed at random, which will be presented to the turning station PI.

We will now describe, with changes in position shown in dotted lines;

a 180° turning operation of a pipe assuming that the pipe to be turned is correctly placed at the turning station PI, that is, just above support cradle 21 of turner PI (which is not always the case, following the quality control and pipe removal operations which have just been mentioned); and a one-step p translation operation of turner PI to place its support cradle 21 just beneath a pipe T to be turned, when cradle 21 was beneath a pipe which was not to be turned (the preceding pipe having been turned) or beneath a pair of empty V-shaped supports.

180° Turn (FIGS. 3, 4, 4A, 5, 6, 7)

A pipe T has just stopped above cradle 21 which is in its low position since the hoisting jack 10 is at its low position (FIG. 3—position of the hoisting arms 14 shown by the solid line). The motoreductor group 18 is stopped. Jack 10 is supplied with fluid under pressure in order to bring arms 14 into the high position (dotted line on FIG. 3 and solid line on FIG. 4).

During the raising of cradle 21, parallel to itself and transverse to direction f, pipe T is raised by cradle 21 above transporter A and, in particular, above the layer of transported pipes.

In the high position of pipe T, the 180° turn is carried out in the horizontal plane of rotation of cradle 21, in the following manner (FIGS. 5, 6, and 7):

(a) Before rotation (FIG. 5): Cranks 22 and 24 as well as rod 27 extend one from the other. The alignment of pivots 23 and 26 and shaft 19 are in plane view. Shafts can also be called pivots. Pivots 23 and 26 are on opposite sides of pivot 19.

The motoreductor group 18 is started up.

(b) During rotation (FIG. 6) shaft 19, rotatably driven, turns the first driving crank 22 such that pivot 23 makes a trajectory in an arc of a circle shown by a dotted line. The connecting rod 27 in turn drives pivot 26 and the driven crank 24. Pivots 23 and 26 and shafts 19 and 25 of the two cranks 22 and 24 and of the connecting rod 27 form in plane view the pivots of an articulated quadrilateral whose cranks 22 and 24 and rod 27 constitute a kinematic assembly known as "three bars". Pivot 26 of the driven crank 24 has a trajectory in an arc of a circle shown by a dotted line. Driven shaft 25 turns the large toothed wheel 28 which in turn turns the small toothed wheel 29 in opposition and consequently turns shaft 20, cradle 21 and pipe T (directions of rotation indicated by arrows).

The ratio of the angular speeds of pivots 19 and 25 being equal to the inverse of the ratio of the respective distances of pivots 19 and 25 from a point E (FIG. 6) defined by the intersection of the segments in dotted lines joining the pivots 19 and 25, on the one hand, and 23 and 26, on the other hand, the dimensions of cranks 22-24 and of rod 27 are such that the driven crank 24 turns half as fast as the driving crank 22. The ratio of the speeds of rotation of the toothed wheels 28 and 29 being the inverse of that of their diameters and the diameter of wheel 28 being double that of wheel 29, wheel 29 turns twice as fast as wheel 28. The kinematics of the "three bars" system (cranks 22-24 and rod 27) preferably ensures an acceleration at the beginning of rotation and a deceleration at the end of rotation and hence progressiveness in the initial starting up and the final slowing down which avoids subjecting pipe T laid on cradle 21 to jolts.

(c) At the end of rotation (FIG. 7), that is after pivot 23 of the driving crank has covered a semi-circle, the motoreductor group 18 stops. The two cranks 22 and 24 and the connecting rod 27 are again lined up (alignment of pivots 19, 23 and 26 of the "three bars" system, pivots 23 and 26 being on a same side in relation to pivot 19). The driving crank 22 has carried out a half-revolution (180°) whereas the driven crank 24 has carried out only a quarter of a revolution (90°). In other words, the complete trajectory of pivot 23 is a semi-circle and that of pivot 26 is a quarter of a circle. Toothed wheel 28 has turned by 90° but at the same time, toothed wheel 29 has turned by 180°. By comparing FIGS. 5 and 7, it can be seen that joint M of pipe T, which was initially located on the left, is finally located on the right of the plane drawing.

Lowering of the turned pipe T: Jack 10 is activated so as to return the hoisting arms 14 from the position shown by a dotted line in FIG. 3 to the position shown by a solid line in FIG. 3. The assembly of the frame 16 descends with cradle 21 and pipe T which is redeposited on the V-shaped support 3 which it left.

After turning pipe T, the transporter A is again started up and moves forward by two steps in the direction of transporter B after which it stops for another pipe to be turned.

Figure 9:
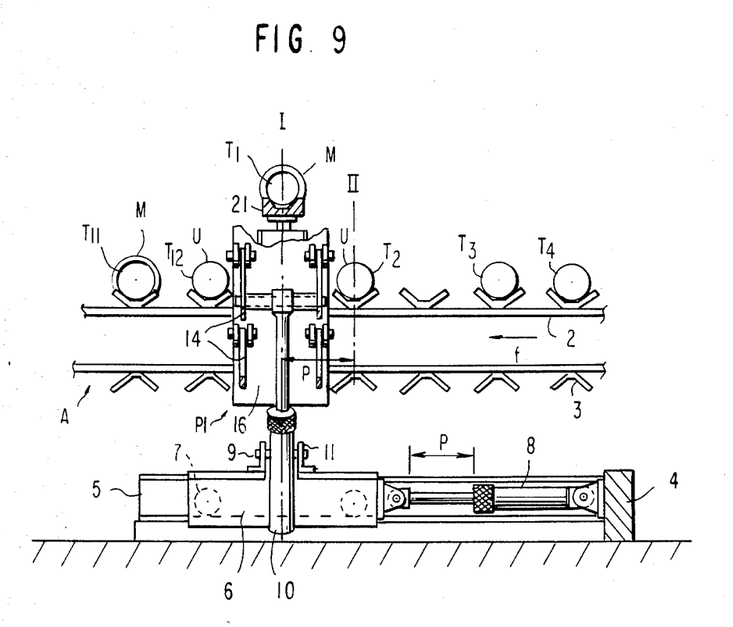
FIG. 9 is a view corresponding to FIG. 8 of the turner in the high position above the transporter and of the layer of pipes transported after turning a pipe through 180°.

The "three bars" transmission avoids having to subject the pipe being turned to jolting and, due to the small space it occupies, fits easily into a passage between two pipes laid on transporter A on either side of turner PI (FIG. 9). The torque of gears 28-29 re-establishes the speed necessary for turning, after its reduction by the "three bars" system.

Translation of one step p of turner PI (FIGS. 8, 9, and 10 to 16) (between positions I and II)

It was assumed above that a pipe T to be turned was effectively placed just above turner PI during a stop by transporter A.

Figure 8:
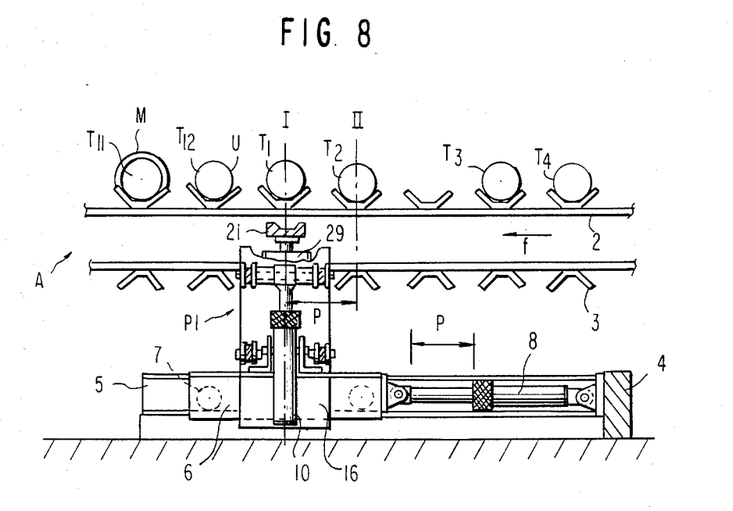
FIG. 8 is a partial schematic view of a cross-section of the turner taken along line 8—8 of FIG. 5, at the end of a one step translation in the advance direction of the transporter, and in the low position in relation to the transporter, the turner being in the position preceding the turning of a pipe.

It has also been described above that this is not always the case due to removal of certain pipes T at a control station Q (FIG. 2) when such pipes had defects. The result is that the interval between pipes to be turned (one pipe out of two which pass in front of turner PI has to be turned) may be of an odd number of steps whereas the transporter A advances by two steps. FIGS. 8 and 9 illustrate, in elevation, turner PI and a part of transporter A carrying a series of pipes T11–T12 arranged head-to-tail downstream from turner PI and T1 to T4 on turner PI and upstream from said turner, with an empty space between pipes T2 and T3. Pipe T1 to be turned after pipe T12 is located above turner PI and is consequently turned in FIG. 9 without movement of jack 8 and therefore without movement of turner PI.

The schematic FIGS. 10 to 13 illustrate a number of V-shaped supports 3 and pipes T1 to T9 as well as turner PI, shown solely by its cradle 21. Also shown is the evolution of the backward and forward operations of turner PI depending upon the location of the pipe to be turned, for the production first of an odd numbered bed of pipes (FIGS. 10 to 13), then for the production of consecutive even numbered beds.

Odd Bed

Figure 10:
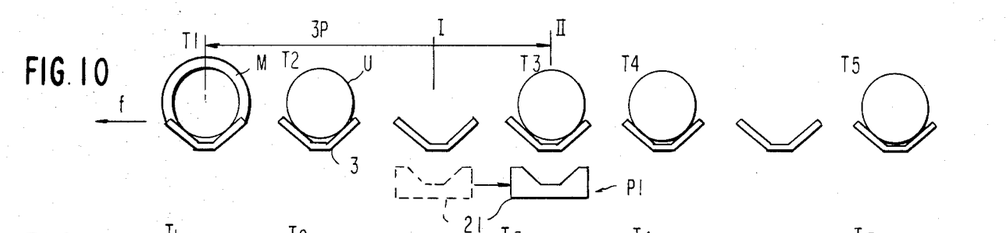
FIGS. 10 to 13 are schematic views illustrating the successive and relative positions of the pipe transporter and the turner evolving in translation between two positions one step apart with a view to turning one pipe out of two, in order to produce odd numbered beds of pipes.

In FIG. 10 transporter A has moved forward by two steps in relation to FIG. 9. Pipes T1 and T2 have passed in the head-to-tail position downstream of turner PI. As the V-shaped support 3 which was empty between pipes T2 and T3 would have been located above turner PI had turner PI remained in position I, in order to turn pipe T3, turner PI has been moved from position I to position II during the advance of transporter A (former position: broken line—new position: solid line). Thus pipe T3, which is at intervals of three steps from the preceding turned pipe T1 and of one step from the former position of turner PI, is located just above the new position of turner PI. It is clear that, if turner PI had not been moved in translation, pipe T3 would not have come above turner PI during the next advance of two steps of transporter A, but would be placed at one step downstream of turner PI (former position).

Figure 11:
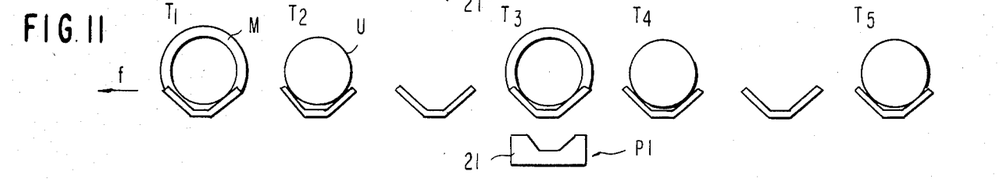

FIG. 11: After turning of pipe T3 at position II, the next pipe to be turned is T5, which is three steps away from position II.

Figure 12:
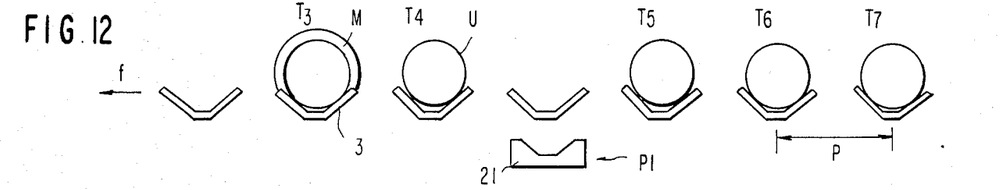

FIG. 12: After an advance of two steps, pipe T5 is no more than one step from position II where turner PI is located.

Figure 13:
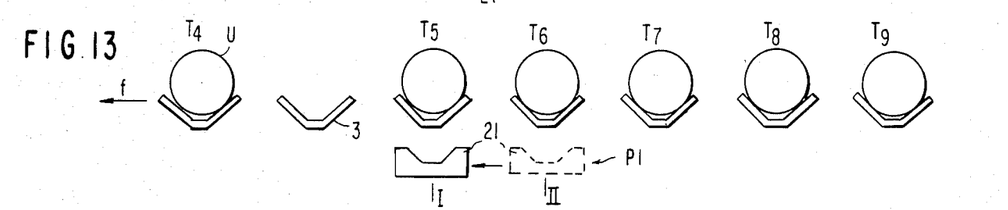

FIG. 13: After a new advance of two steps, and, simultaneously, an advance of one step of the turner PI from position II to position I, pipe T5 is above turner PI.

To produce a bundle of odd beds (FIGS. 1 and 1A) (for example: three beds of five pipes), it has been seen that the head-to-tail pipes, with offset ends, were delivered by turner PI in the following order, with bell jointed ends M and smooth ends U:

M-U-M-U-M

U-M-U-M-U

M-U-M-U-M which shows that the rule of turning one pipe out of two is applied.

This is not always the case for producing a bundle of even beds (for example three beds of four pipes) whose ends are to be arranged in the followig manner:

M-U-M-U

U-M-U-M

M-U-M-U

Figure 14:
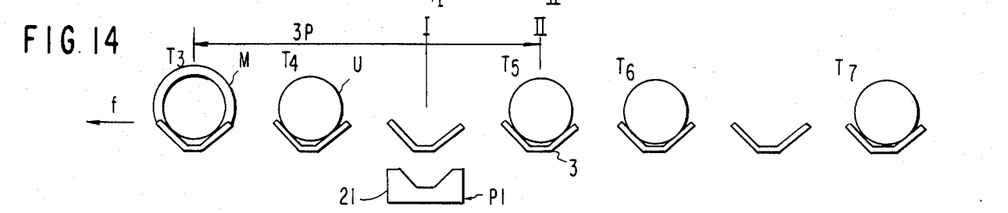
FIGS. 14 to 16 are views like those of FIGS. 10 to 13, to illustrate the production of even numbered beds of pipes.
Figure 15:
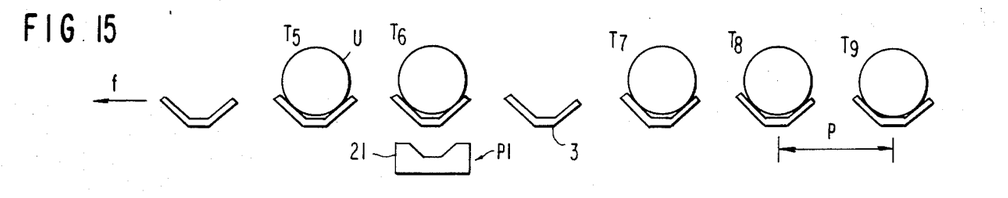
Figure 16:
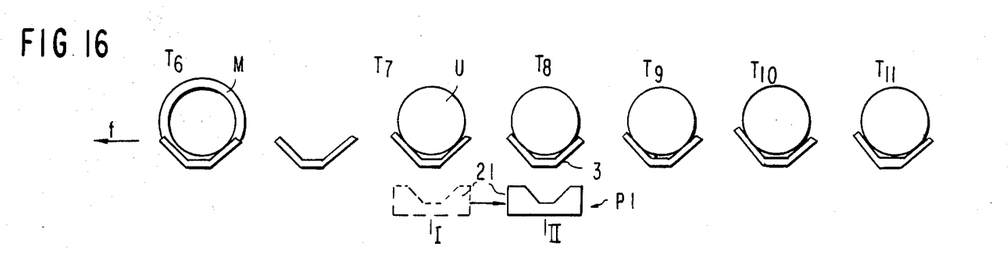

Production of successive even beds (FIGS. 14 to 16)

It will be noted that the last pipe of an upper bed has the same arrangement as the first pipe of the next bed and that, consequently, the first pipe of the next bed is not to be turned. The succession of operations for three beds of four pipes numbered from T1 to T2 is therefore the following:

FIG. 14: The last pipe T4 of the first bed has just passed downstream of turner PI which is assumed to be in position I. The first pipe T5 of the next bed is at one step from turner PI and at three steps from the preceding pipe turned T3. But T5 is not to be turned.

FIG. 15: After a two-step advance by the transporter, pipe T5 passes downstream of turner PI whereas the following pipe to be turned T6 is placed in position I above turner PI which will do its work during the stop of transporter A. The next pipe to be turned is not T7 but T8 which is at three steps from position I.

FIG. 16: After a two-step advance by transporter A and simultaneous movement of one step of turner PI from position I to position II, pipe T8 to be turned is located above turner PI.

It can therefore be seen that, except for pipes T5 and T9, the rule of turning one pipe out of two is followed.

As can be seen, it is not only the mobility of turner PI back and forth between positions I and II which enables the pipes to be turned whatever their position which saves time, but also the translation of the turner during the forward movement of the chains of transporter A saves time as well.

Of course, the movement of turner PI between positions I and II could also take place during a stop of the chains of transporter A, but that would be less advantageous.

Finally, whether the beds are odd or even numbered, the offsetting of the pipes in beds and bundles (FIG. 1A) is obtained easily by simple turning of a pipe in view of the decentering e of its middle C in relation to the turning axis YY which is located in the symmetry plane P—P (middle) of a bed or bundle. This economizes on an offsetting device or longitudinal shifting device for one pipe out of two, downstream from turner PI.

What is claimed is:

1. A method for arranging cast iron jointed pipes head-to-tail, comprising: turning by 180° one pipe out of two on a pipe transporter with two parallel chains having intermittent movements separated by regular stops, said pipes being arranged in pairs on said transporter, bell joints and smooth ends of two consecutive pipes being placed respectively on a same side of said transporter with two parallel chains, said transporter moving by periodic forward movements equal to two steps between consecutive pipes, selected pipes being removed from the transporter before reaching a turning station, wherein, depending upon whether each next pipe to be turned is distant from said turning station by an even or odd number of steps, said turning station remains fixed when the pipe to be turned is distant by an even number of steps and is moved in translation by one step, parallel to the direction of movement of said transporter, in the forward direction of said transporter or in the opposite direction, to place said turning station at the same position as the pipe to be turned when the pipe to be turned is distant by an odd number of steps, before turning the pipe by 180° during a stop of said transporter, by hoisting said pipe above the layer of transported pipes, turning, and laying said pipe back down on the transporter.

2. The method of claim 1, wherein the movement in translation of one step of the pipe turning station is carried out during an advance of two steps of said chains of said pipe transporter.

3. The method of claim 1, wherein the middle of the pipe to be turned is offset in relation to the turning axis.

4. Apparatus for handling jointed pipes, comprising: a horizontal pipe transporter (A) with parallel endless chains (2) fitted with V-shaped pipe supports (3), said supports being spaced apart by one step, and, between said two parallel chains, turning means (PI) for turning a pipe by 180°, said turning means comprising a horizontal cradle (21) for supporting a pipe (T), means for raising said cradle from a low position beneath said transporter to a high position above said transporter and for lowering said cradle from said high position to said low position, means for turning said cradle in said high position by 180°, wherein said turning means along with said pipe raising and lowering means (10–14) and said means for rotating a pipe by 180° (16-18-22-24-27-28-29) which are interconnected, are carried by a carriage (6) and means are provided to move the carriage in translation by one step in one direction or in the opposite direction between two pipe turning positions (I and II), parallel to said chains of said transporter, whereby said turning means remains fixed when the pipe to be turned is distant from said turning means by an even number of steps and said turning means is moved by one step when the pipe to be turned is distant from the turning means by an odd number of steps.

5. The apparatus of claim 4, wherein the raising and lowering means of turning means comprises a parallelogram which is articulated in a vertical plane with parallel arms (14) carrying a frame (16) which itself carries means for rotatably driving a pipe, said parallel arms being articulated at their ends, on the one hand, on said carriage, and on the other hand, on said frame.

6. The apparatus of claim 5, wherein said parallel arms are activated by an approximately vertical jack (10) which is articulated horizontally (9) on said carriage.

7. The apparatus of claim 4, wherein means for rotatably driving the turner comprises a torque of toothed wheels, one large (28), the other small (29), said torque being a rotation speed multiplier for said cradle (21) which is wedged on the same driven shaft (20) as said small toothed wheel (29) in relation to the rotation speed of said large toothed wheel, and an articulated system for rotation acceleration and deceleration with three bars comprising a small crank (22) which is rotatable with a driving shaft or motor (19), a large crank (24) which is rotatable with a driven shaft (25) which is rotatably connected to said large toothed wheel, a rod (27) for connecting with said cranks (22 and 24) by two pivots or end pins (23 and 26), said two cranks and rod of said three bar system being horizontal.

8. The apparaus of claim 7, wherein the diameter of said large toothed wheel is roughly twice that of said small toothed wheel and wherein the length of said large crank is roughly twice that of said small crank.

9. The apparatus of claim 4, wherein said carriage is moved in translation by a jack (8) parallel to said chains of said transporter.

10. The apparatus of claim 4, wherein said cradle (21) supports a pipe without fixation, the middle (C) of said pipe being offset by a decentering length (e) in relation to the middle of said cradle which is on the turning axis (YY).

* * * * *